United States Patent Office 3,086,047
Patented Apr. 16, 1963

3,086,047
PRODUCTION OF HALOGEN SUBSTITUTED PHOSPHINES
Eugen Hofmann, Norton-on-Tees, England, assignor to Imperial Chemical Industries Limited, London, England, a corporation of Great Britain
No Drawing. Filed Aug. 17, 1960, Ser. No. 50,058
Claims priority, application Great Britain Aug. 28, 1959
6 Claims. (Cl. 260—543)

This invention relates to production of halogen substituted phosphines, which are useful as intermediates in, for example, the preparation of phosphorus containing polymers.

According to the present invention there is provided a process for production of halogen substituted phosphines, which process comprises reacting a carbonyl halide with a compound of formula $R_1R_2PH$, in which $R_1$ is a hydrogen atom or an unsubstituted or substituted hydrocarbon group and $R_2$ is an unsubstituted or substituted hydrocarbon group.

The reaction may conveniently be effected at any temperature up to the boiling point of the solvent or even without application of external heat.

The process may conveniently be carried out in solution. If a solvent is used it should be one which is substantially inert to the reactants and the reaction products. Suitable solvents are solvents for phosgene and include hydrocarbons such as the lower aromatic hydrocarbons, especially benzene; cyclohexane; and liquid aliphatic hydrocarbons, e.g. gasoline. Lower aliphatic ethers such as diethyl and dipropyl ether are also suitable. One convenient method for effecting the process comprises dissolving the carbonyl halide in a suitable solvent and dropping the resulting solution on to the reactant of formula $R_1R_2PH$.

The carbonyl halide is preferably phosgene.

Whereas $R_1$ and $R_2$ may be different radicals, they may conveniently be the same. $R_1$ and $R_2$ are preferably aryl radicals, and in particular phenyl radicals.

When both $R_1$ and $R_2$ are hydrocarbon groups, the product of the process is a monohalogen substituted phosphine; but when $R_1$ is hydrogen the product is a dihalogen substituted phosphine.

A specific example of a process according to the invention is the reaction between diphenyl phosphine and phosgene, which may conveniently be effected by dropping a solution of phosgene in benzene on to the diphenyl phosphine. The product is diphenyl monochloro phosphine; and the reaction may be represented by the following equation. Examples of other compounds which may be prepared are phenyl dichloro phosphine, methyl dichloro phosphine, ethyl dichloro phosphine and cyclohexyl dichloro phosphine.

$$(C_6H_5)_2PH + COCl_2 \rightarrow (C_6H_5)_2PCl + CO + HCl$$

The process is of greatest value in relation to the production of secondary chloro phosphines because these are difficult to produce by other methods.

The starting material for this reaction may conveniently be prepared by reaction of triphenyl phosphine with an alkali metal, such as for example lithium or potassium, in a suitable solvent, such as for example tetrahydrofuran or dioxan, followed by hydrolysis of the phospho alkali metal compound formed.

*Example 1*

8.2 gm. of diphenyl phosphine were introduced into a flask which was continuously flushed with argon. About 10% more than the equimolecular amount of phosgene was dissolved in 50 ml. of benzene, and the resulting solution was added dropwise, without stirring, to the diphenyl phosphine. Hydrogen chloride and carbon monoxide were evolved during the reaction.

The remaining clear solution was distilled, yielding 7.7 gm. of a fraction distilling at 178° C.–180° C./15 mm. Hg. This corresponded to a yield of 75%. On analysis the product was found to contain 16.1% of chlorine. The calculated chlorine content of diphenyl monochloro phosphine is 15.7%.

*Example 2*

This describes the preparation of diethyl monochlorophosphine. A solution containing 4.75 gms. of phosgene dissolved in 28 mls. of benzene was slowly added over 2 hours to a solution containing 4.3 gms. of diethyl phosphine dissolved in 80 mls. of benzene contained in a flask maintained at 10–15° C. The effervescence which occurred caused adequate mixing.

After reaction was complete the benzene was distilled off, and on further distillation there was obtained 1.98 gms. of a liquid boiling at 128–131° C. at normal pressure, which corresponds to a theoretical yield of 26.4%. This had the percentage composition:

|  | C | H | P | Cl |
|---|---|---|---|---|
| Found | 41.6 | 8.0 | 20.9 | 26.6 |
| Theory for $(C_2H_5)_2PCl$ | 38.6 | 8.0 | 24.9 | 28.5 |

The halogen substituted phosphines made by the process of the invention yield polymers which have high melting points, are flexible and non-flammable.

I claim:
1. Process for producing secondary organic phosphorus halide compounds which comprises reacting phosgene with a compound of formula $(R)_2PH$ in which R is a radical selected from the group consisting of lower alkyl and aryl groups, said reactants being present in stoichiometric amounts and said reaction being conducted in a solvent inert to the reactants.
2. Process as claimed in claim 1 in which the solvent is benzene.
3. Process as claimed in claim 1 in which the solvent is an ether selected from the group consisting of diethyl and dipropyl ether.
4. Process as claimed in claim 1 in which R is phenyl.
5. Process as claimed in claim 1 for the production of diphenyl monochloro phosphine from diphenyl phosphine.
6. Process as claimed in claim 1 for the production of diethyl monochloro phosphine from diethyl phosphine.

References Cited in the file of this patent

UNITED STATES PATENTS 2,437,796 Walling _____ Mar. 16, 1948
2,437,798 Walling _____ Mar. 16, 1948

OTHER REFERENCES

Michaelis et al.: Ber. Deut. Chem., vol. 12, pp. 338–340 (1879).
Conant et al.: J.A.C.S., vol. 45, pp. 165 to 171 (1923).
Beeby et al.: J. Chem. Soc. (London), vol. of 1951, pp. 411–415.
Arbuzov et al.: C.A., vol. 48, p. 7540 (1954).